United States Patent [19]

Tseng

[11] Patent Number: 5,407,456
[45] Date of Patent: Apr. 18, 1995

[54] EXHAUST GAS PURIFYING DEVICE FOR VEHICLES

[76] Inventor: Ching-Chih Tseng, No. 156, Chung Tso Rd., Lin-Yuan Hsiang, Kaohsiung Hsien, Taiwan, Prov. of China

[21] Appl. No.: 188,011

[22] Filed: Jan. 28, 1994

[51] Int. Cl.[6] .............................................. B01D 47/00
[52] U.S. Cl. ........................................ 55/228; 55/229; 55/257.6; 55/307; 55/338; 55/426; 55/442; 55/494; 55/DIG. 30
[58] Field of Search ............ 55/228, 229, 257.1, 55/257.6, 276, 307, 338, 426, 442, 465, 466, 494, 495, DIG. 30

[56] References Cited

U.S. PATENT DOCUMENTS

| | | | |
|---|---|---|---|
| 1,847,506 | 3/1932 | White | 55/DIG. 30 |
| 2,087,411 | 7/1937 | Lundquist | 55/DIG. 30 |
| 3,353,335 | 11/1967 | Caballero | 55/DIG. 30 |
| 3,566,583 | 3/1971 | Ashmore | 55/257.6 |
| 3,742,682 | 7/1973 | Ligutom | 55/DIG. 30 |
| 3,796,546 | 3/1974 | Poullot et al. | 55/DIG. 30 |
| 4,184,858 | 1/1980 | Walker | 55/DIG. 30 |
| 4,301,652 | 11/1981 | Sohda et al. | 55/276 |
| 4,529,421 | 7/1985 | Parma | 55/DIG. 30 |
| 4,949,539 | 8/1990 | Hsu et al. | 55/DIG. 30 |
| 5,180,406 | 1/1993 | Shih | 55/DIG. 30 |

*Primary Examiner*—Charles S. Bushey
*Attorney, Agent, or Firm*—Jacobson, Price, Holman & Stern

[57] ABSTRACT

An exhaust fume purifying device includes a separator for receiving exhaust fumes and cooling water from the engine of a vehicle to mix the exhaust fumes and water so as to dissolve the toxic component of the exhaust fumes and allow cleaned gas separated from liquid to be exhausted. The water drips through two perforated partitions in the separator to a lower half of the separator to flow into a water filter tank for being cleaned and is then pumped back to a water tank of the engine.

1 Claim, 3 Drawing Sheets

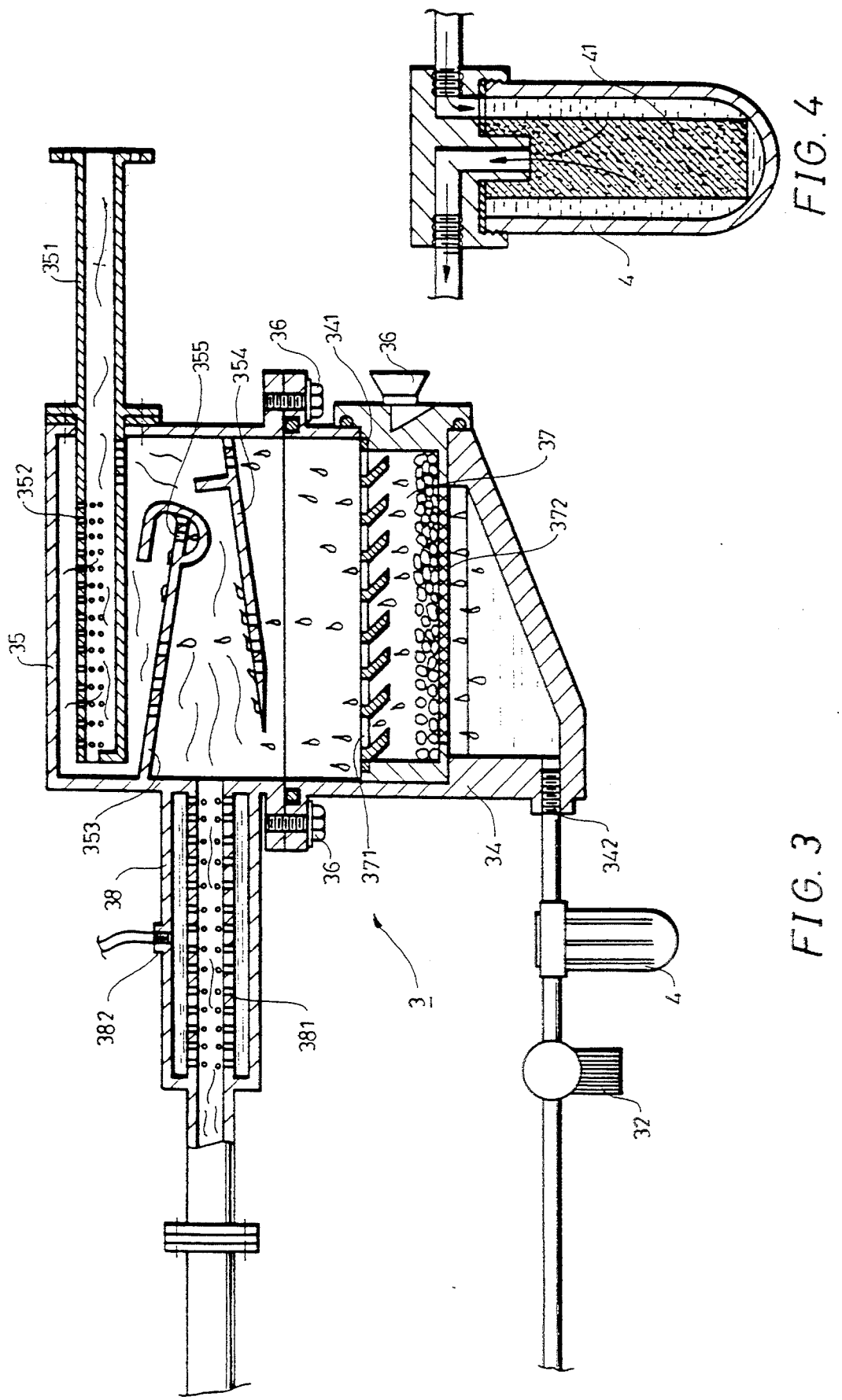

EXHAUST GAS PURIFYING DEVICE FOR VEHICLES

BACKGROUND OF THE INVENTION

At present exhaust fumes from the engine of a vehicle flow through an exhaust pipe and through a muffler to be exhausted. As exhaust fumes generally contain a large amount of incompletely burned gasoline and carbon monoxide, which is toxic to human bodies laws are enacted to limit toxic gas emission to protect human health and the environment.

However, vehicles can produce toxic gas in exhaust fumes of a greater amount than the law allows after they are used for a certain period of time.

SUMMARY OF THE INVENTION

An exhaust fume purifying device for vehicles in the present invention has been devised to have a purpose of purifying exhaust fumes from the engine of a vehicle by mixing it with water to let the toxic component dissolve in water and then the water is to be filtered for recycling it in cooling the engine.

BRIEF DESCRIPTION OF DRAWINGS

FIG. 3 is a cross-sectional view of the filter.

FIG. 4 is a cross-sectional view of a filter tank in the exhaust fume purifying device.

DETAILED DESCRIPTION OF THE INVENTION

Figure 1:
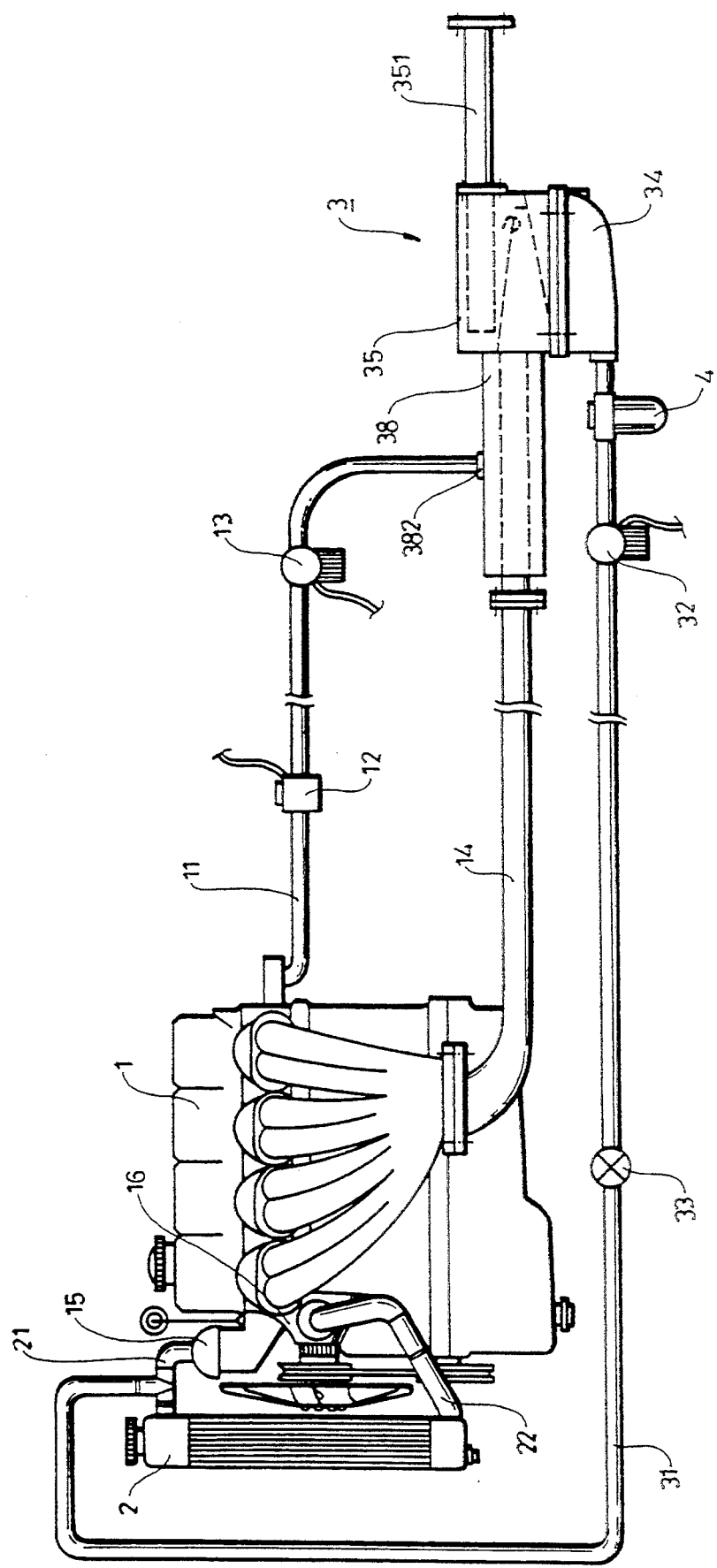
FIG. 1 is a schematic structural view of an exhaust fume purifying device for vehicles.

An exhaust fume purifying device for vehicles in the present invention, as shown in FIG. 1, comprises a water tube 11 to discharge cooling water from engine 1, an electromagnetic valve 12 to be turned on electrically when the engine 1 is started, a pump 13 to be started by the valve 12 to pump cooling water into the tube 11 and then into a mixing tube 38. The engine 1 exhausts fumes through an exhaust tube 14 into the mixing tube 38, forcing the toxic component of the fumes to dissolve in water coming into the mixing tube 38 from the water tube 11. Then the water with the toxic component dissolved therein enters a separator 3, in which gas separates from the liquid, and flows up to enter an exhaust tube 351 to exhaust through its outer end into the open air, and the water coming from the mixing tube 38 into the separator will drop down to the bottom of the separator 3 and then be sent into a water filter tank 4 for filtering and then pumped out by a pump 32 into a water tank 2 through a check valve 33. A temperature control valve 15 is provided to be connected between a tube 21 coming out of an upper portion of the the water tank 2, automatically opens to let hot water warmed up to more than 70° C. by idle warming-up working of the engine flow back directly through the tube 21 into the water tank 2 and force the cool water therein to flow through a tube 22 coming out of a lower portion of the water tank 2 and pumped by a pump 16 to flow into the engine 1 for cooling it quickly.

Figure 2:
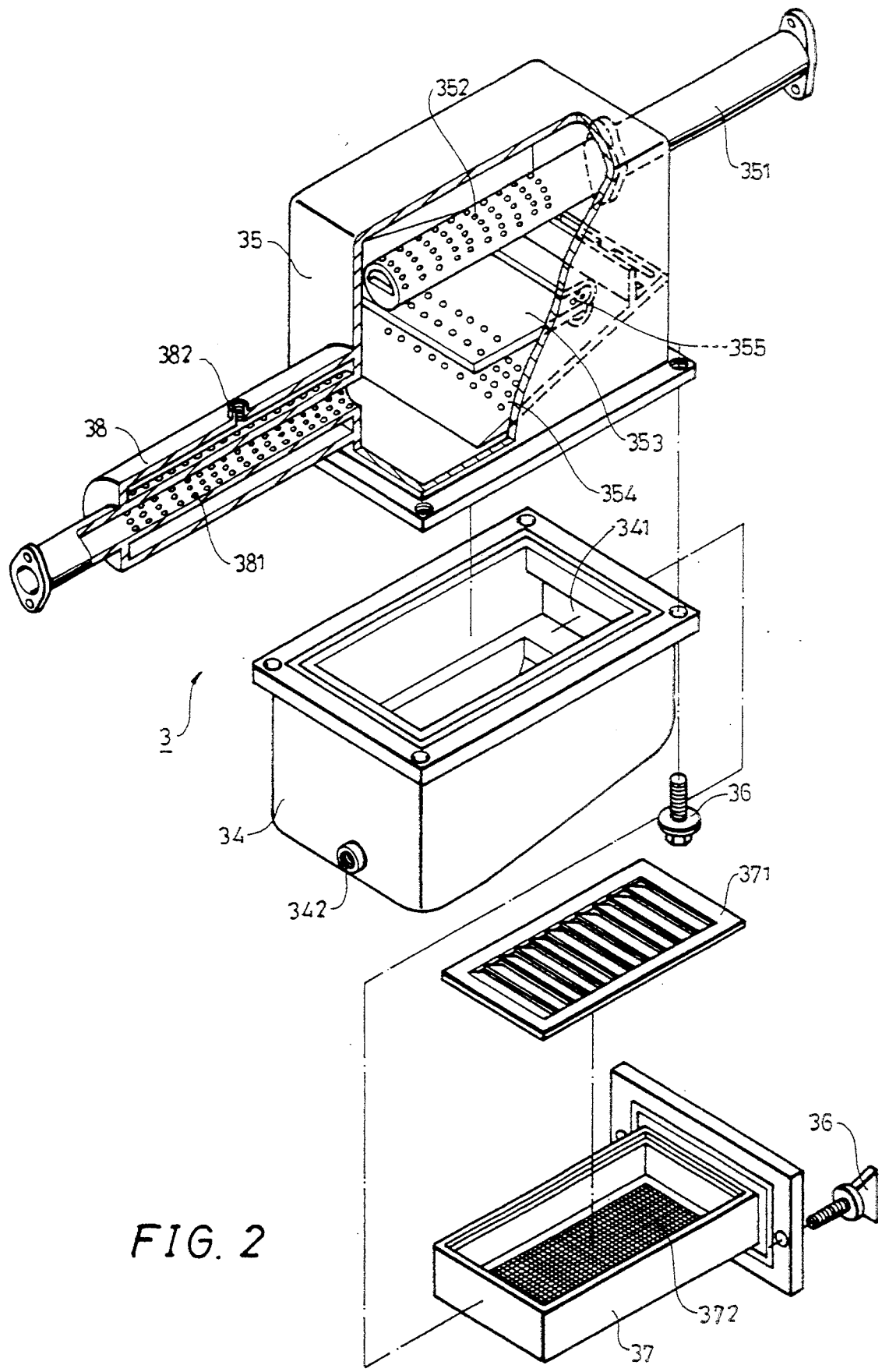
FIG. 2 is an exploded perspective view of a filter in the exhaust gas purifying device.

The separator 3 shown in FIG. 2 comprises lower half separator 34 and an upper separator 35 separably combined together by means of bolts 36. The lower half separator 34 has an open window 341 in a vertical side for a drawer-shaped filter 37 to pass through therein and secured by the bolts 36 to prevent water leakage. Anti-leak gaskets are provided between the upper and the lower half separator 34 and 35, and between the window 341 and filter 37 for preventing water leakage. The filter 37 has a filter net 372 and an independent filter board 371 is deposited on the filter net 372 for condensed dirt sediments in water to lie on the net 372 and for water to flow through. The lower half separator 34 has a drain hole 342 in a low wall of a vertical side. The filter board 371 helps water to be better filtered by the net 372 when dripping down, and can be taken off the filter 37 for cleaning or displacement.

The upper half separator 35 is placed to cover the top of the lower half separator 34, having a horizontal exhaust tube 351 extending longitudinally therein and bored with many small holes 352 in the portion which is disposed in the upper half separator 35 for gas separated from liquid to flow through and then pass out of the exhaust tube 351. The upper half separator 35 also has mixing tube 38 extending horizontally from a vertical side and having an outer tube and an inner tube. The inner tube has an outer end connected with exhaust tube 14 and an inner end formed on the vertical side of the upper half separator 35, having many small water holes 381 for water coming from the tube 11 to enter to shower exhaust fumes coming through the inner tube. The outer tube of the mixing tube 38 has an inlet 382 for water to flow therein and then through the holes 381 into the inner tube so that fumes in the inner tube can be showered with water to mix the fumes with water, which then flows into the separator 3 and separates gas from the water. Therefore, the exhausted fumes from the engine 1 are first mixed with water and then toxic gas or incompletely burned gasoline can be absorbed in the water and separated from air and finally purified.

As shown in FIGS. 2 and 3, the upper half separator 35 is provided also stopping boards or partitions 353, 354 inside so that water mixed with exhaust fumes may collide with the boards 353, 354, flow down along the boards and then drip onto filter board 371 and the filter 37. Then gas separated from water flows up and through the outer end of the exhaust tube 351 to the open air. If the exhaust fumes should have a little water mixed therein, it would drip down along the stopping boards 353, 354.

The filter tank 4 shown in FIG. 4 is filled with filter material 41, and has an inlet at an upper portion of a spherical wall for water to enter into the filter material to be filtered and then to be led out of a tube 31 to flow back to the water tank 2.

In operation exhaust fumes coming from the engine 1 and cooling water from the engine 1 flow at the same time into mixing tube 38, to shower exhaust fumes with water to mix them whereby toxic gas and incompletely burned gasoline dissolve in water, gas separates from liquid in the separator 3 to purify fumes to a large extent so as to be exhausted and filter the water coming out of the separator by the filter tank 4 and return the filtered water back to the water tank 2 for recycling use. Thus the interior of the engine 1 cannot be blocked with miscellaneous accumulated matter, nor can be the tubes connected with the water tank 2, resulting in good circulating cooling operation, low exhausting noises, and little pollution. Also, the filter 37 the filter board 371 and the filter net 372 can be taken off at a proper time for cleaning so water can be used for long period of time without causing problems and the cooling effect can be maintained almost the same, no matter whether a car is just started or has already run for a long period of time and the engine has gotten rather hot.

What is claimed is:

1. An exhaust fumes purifying device for a vehicle engine comprising:

a valve connected on a water tube coming out of the engine to be turned on electrically to actuate a pump when the engine is started;

a pump being actuated to pump water in the tube coming from the engine to flow into a mixing tube of a separator;

a separator comprising:

a lower half separator having an open window in a vertical side for a drawer-shaped filter to pass through to be positioned in said lower half separator and means for securing the filter in said lower half separator, the lower half separator having a sloped bottom for water to flow to an outlet provided in a lower vertical side after dripping down through said filter;

a filter board to be placed on said drawer-shaped filter to receive water dripping down from stopping boards in an upper half separator;

an upper half separator separably combined on said lower half separator, having an open bottom for water to drip down, two internal partitions extending slopingly in a horizontal direction from two vertical sides of the upper half separator and having plural water holes therein, a closed top side, a gas exhaust tube provided horizontally above said partitions and extending out of said upper half separator the gas exhaust tube having plural holes in a portion thereof in said upper half separator for purified gas to flow through and to flow out of an outer end of the exhaust tube, the mixing tube extending from a lower portion of a vertical side of the upper half separator and having an inner tubular portion and an outer tubular portion, the outer end of said inner tubular portion connected with an exhaust tube coming from the engine to receive exhaust fumes from the engine, said outer tubular portion having a water inlet connected with the water tube coming from the engine;

a water tank containing cool water to be supplied to the engine for cooling it;

a temperature controlled valve disposed on a tube between the engine and said water tank, to open and allow hot water from the engine to flow into the water tank at a preset temperature, and to close to allow cooling water from the water tank to flow around the engine, through the tube coming out of the engine, said separator, a check valve, a water filter tank and back to the water tank for recycling use; and a filter tank disposed on a further tube between said separator and the water tank for filtering water coming out of said separator for the water to be purified thereby and to flow back to said water tank for recycling in the engine.

* * * * *